(12) United States Patent
Dehais et al.

(10) Patent No.: US 8,181,669 B2
(45) Date of Patent: May 22, 2012

(54) COMPLIANT CHECK VALVE STOP

(75) Inventors: John M. Dehais, Windsor, CT (US); Peter J. Dowd, Granby, CT (US); George Kan, West Hartford, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 285 days.

(21) Appl. No.: 12/436,388

(22) Filed: May 6, 2009

(65) Prior Publication Data

US 2010/0282340 A1     Nov. 11, 2010

(51) Int. Cl.
*F16K 15/03* (2006.01)
(52) U.S. Cl. .................. 137/512.1; 137/527; 251/64
(58) Field of Classification Search ............ 137/512.1, 137/527, 315.16, 315.33; 251/286, 64
See application file for complete search history.

(56) References Cited

U.S. PATENT DOCUMENTS

| | | | | |
|---|---|---|---|---|
| 2,358,101 A * | 9/1944 | Randall | ............... | 137/70 |
| 3,172,424 A | 3/1965 | Stillwagon | | |
| 3,384,112 A * | 5/1968 | Smith | ............... | 137/512.1 |
| 3,965,926 A | 6/1976 | Buckner | | |
| 4,230,148 A * | 10/1980 | Ogle, Jr. | ............... | 137/512.1 |
| 4,237,980 A | 12/1980 | Robinson | | |
| 4,257,451 A * | 3/1981 | Paton | ............... | 137/512.1 |
| 4,867,199 A * | 9/1989 | Marx | ............... | 137/512.1 |
| 5,246,032 A * | 9/1993 | Muddiman | ............... | 137/512.1 |
| 6,322,207 B1 | 11/2001 | Hall et al. | | |
| 6,415,595 B1 | 7/2002 | Wilmot, Jr. et al. | | |
| 6,764,169 B2 | 7/2004 | Hall et al. | | |
| 7,114,801 B2 | 10/2006 | Hall et al. | | |
| 7,141,100 B2 | 11/2006 | Dean | | |
| 7,334,422 B2 | 2/2008 | Zywiak et al. | | |
| 7,562,669 B2 * | 7/2009 | McGonigle et al. | ........ | 137/15.18 |
| 7,568,498 B2 * | 8/2009 | Denike et al. | ............. | 137/512.1 |

FOREIGN PATENT DOCUMENTS

EP     1 988 315     11/2008

* cited by examiner

*Primary Examiner* — Kevin Lee
*Assistant Examiner* — Macade Brown
(74) *Attorney, Agent, or Firm* — Cantor Colburn LLP

(57) ABSTRACT

A check valve (10) includes a valve housing (14) having at least one valve opening (16). At least one petal (12) is located in the valve housing (14) and is configured to substantially cover the at least one valve opening (16) when the at least one petal (12) is in a closed position. The at least one petal (12) is rotable about a hinge axis (22) toward an open position thereby allowing fluid to flow through the at least one valve opening (16). The check valve (10) includes at least one compliant petal stop (24), (36) to prevent rotation of the at least one petal (12) beyond the open position.

10 Claims, 4 Drawing Sheets

COMPLIANT CHECK VALVE STOP

BACKGROUND OF THE INVENTION

The subject matter disclosed herein generally relates to check valve assemblies. More specifically, this disclosure relates to petal stops for check valve assemblies.

Check valves are common mechanisms that allow flow in one direction therethrough and prevent flow in the opposite direction. Check valves commonly include one or more petals located at an opening in a housing. The positions of the petals are hinged such that the petals are biased in a closed position across the opening. When the pressure of a fluid (gas or liquid) upstream of the check valve reaches a cracking pressure, the petals open as a result of a change in a differential between pressure upstream and downstream of the check valve and allow the fluid to flow through the valve.

Typical check valves often have one or more physical stops, which are features which limit the angle to which the petals open. When the petals move from the closed to open position, the petals hit the stop (or stops) which prevents the petals from opening further. In some operating conditions, when the petal dynamically impacts the stop and becomes overstressed, a fracture can be initiated in the petal. After which, further impacts to the stop can further propagate the fracture and lead to failure of the petal and check valve. The art would well receive a check valve including an open position stop which reduces the potential for fractures in the petals and thereby lengthens the life of the check valve relative to a typical check valve.

BRIEF DESCRIPTION OF THE INVENTION

According to one aspect of the invention a check valve includes a valve housing having at least one valve opening. At least one petal is located in the valve housing and is configured to substantially cover the at least one valve opening when the at least one petal is in a closed position. The at least one petal can rotate about a hinge axis toward an open position thereby allowing fluid to flow through the at least one valve opening. The check valve includes at least one compliant petal stop to prevent rotation of the at least one petal beyond the open position and prevent an overstressed condition.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
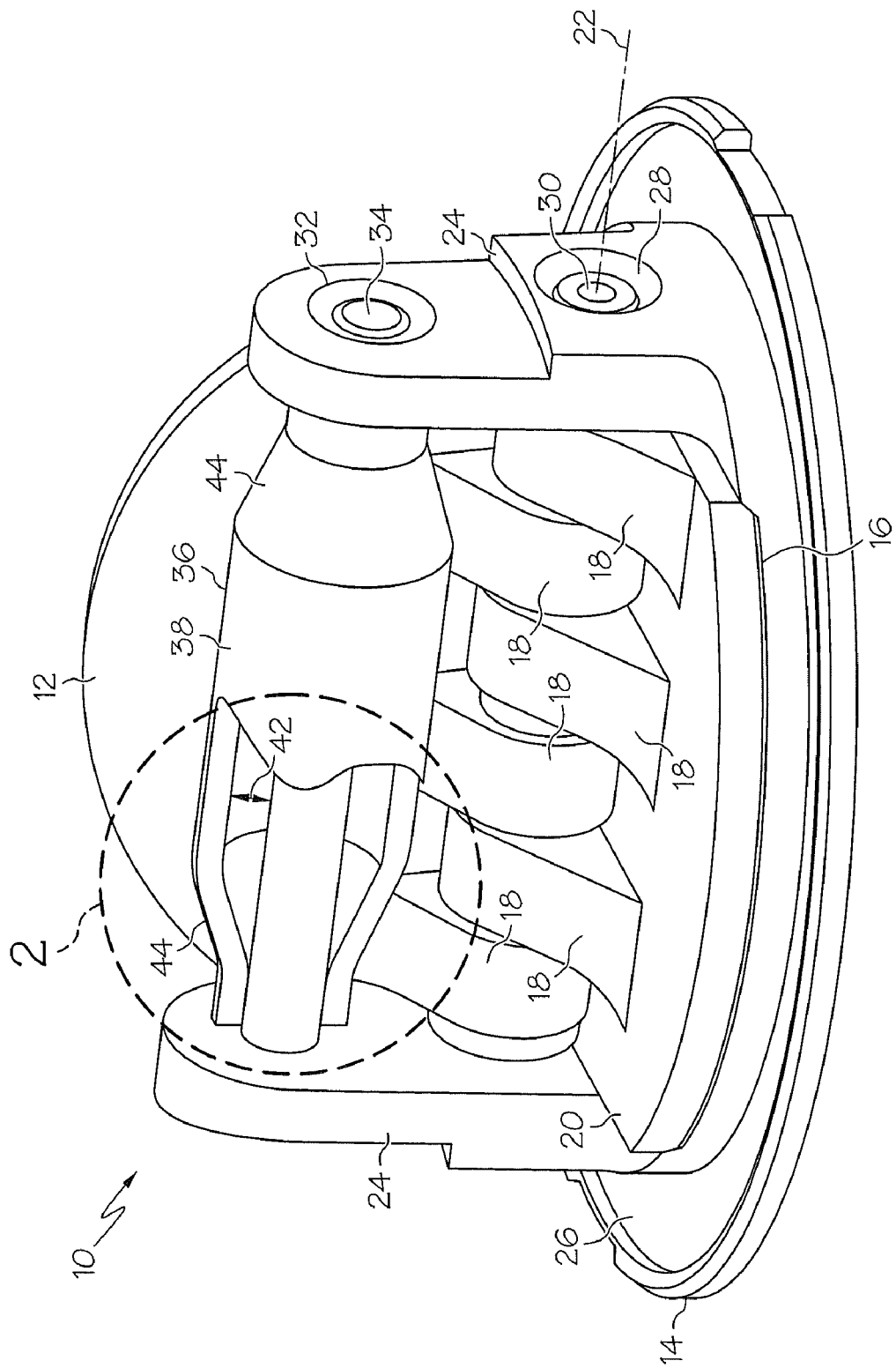
FIG. 1 is a perspective view of an embodiment of a check valve having a compliant petal stop.

Illustrated in FIG. 1 is an embodiment of a check valve 10. The check valve 10 includes one or more petals 12, also often referred to as flappers, disposed in a valve housing 14. The valve housing 14 includes at least one valve opening 16 in which the one or more petals 12 are disposed. While the valve opening 16 shown in FIG. 1 is substantially circular, other valve opening 16 shapes, for example, oval, rectangular or semi-circular, are contemplated within the scope of the present disclosure. The one or more petals 12 are arranged such that in a closed position, the petals 12 cover the valve opening 16, closing the check valve 10.

Each petal 12 includes one or more hinge loops 18 or ears that extend from a petal downstream surface 20. In some embodiments, the hinge loops 18 of the petals 12 may mesh as shown in FIG. 1. When assembled into the check valve 10, the centers (not shown) of the hinge loops 18 are substantially collinear and/or concentric along a hinge axis 22. Two posts 24 extend from a downstream side 26 of the valve housing 14. Each post 24 includes a through hinge pin hole 28 through which a hinge pin 30 extends from a first post 24, through each hinge loop 18 and to a second post 24. In some embodiments, each post 24 includes a stop pin hole 32 through which a stop pin 34 extends from the first post 24 to the second post 24. In other embodiments, the stop pin 34 may be formed as a unitary portion of the valve housing 14 with the posts 24, or may be positioned by another element of the check valve 10.

Figure 2:
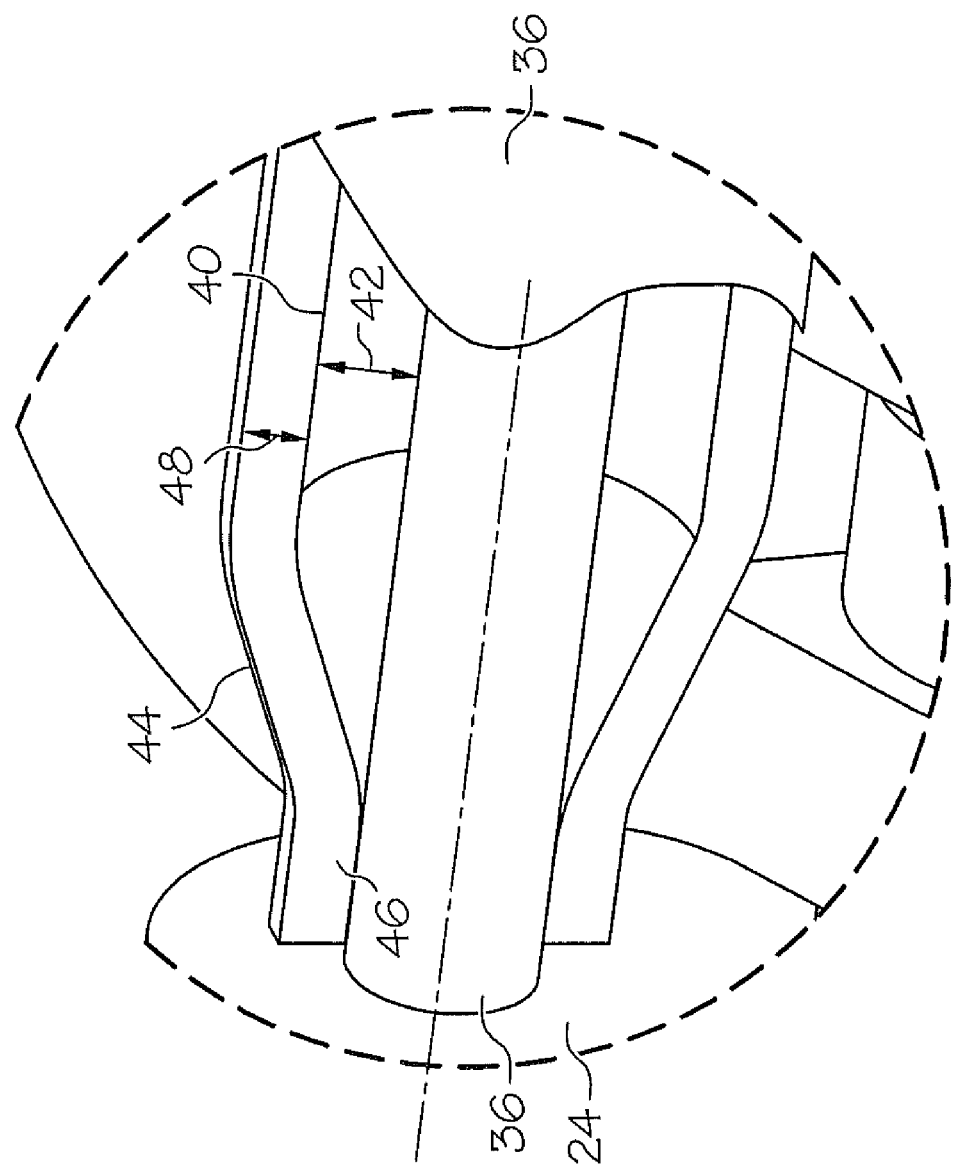
FIG. 2 is an enlarged view of circled area "2" in FIG. 1.

In some embodiments, extending around the stop pin 34 is at least one stop pin collar 36. A single stop pin collar 36 is shown in FIG. 1, but it is to be appreciated that other quantities of stop pin collars 36, for example, two or three stop pin collars 36, are contemplated within the scope of the present disclosure. In some embodiments, multiple stop pin collars 36 may be disposed along a single stop pin 34. Each stop pin collar 36 includes a cylindrical portion 38 that is substantially coaxial with the stop pin 34 and has an inner wall 40 disposed at a distance 42 from the stop pin 34. At each end of the cylindrical portion 38 is a conical end 44. As best shown in FIG. 2, in each conical end 44, the inner wall 40 of stop pin collar 36 tapers from the distance 42 from the stop pin 34 toward the stop pin 34. In some embodiments, a tip 46 of the conical end 44 contacts the stop pin 34. The stop pin collar 36 is configured with a specified thin wall section 48 to flex and absorb impact loads from impact with the petals 12 when the check valve 10 opens.

Figure 3:
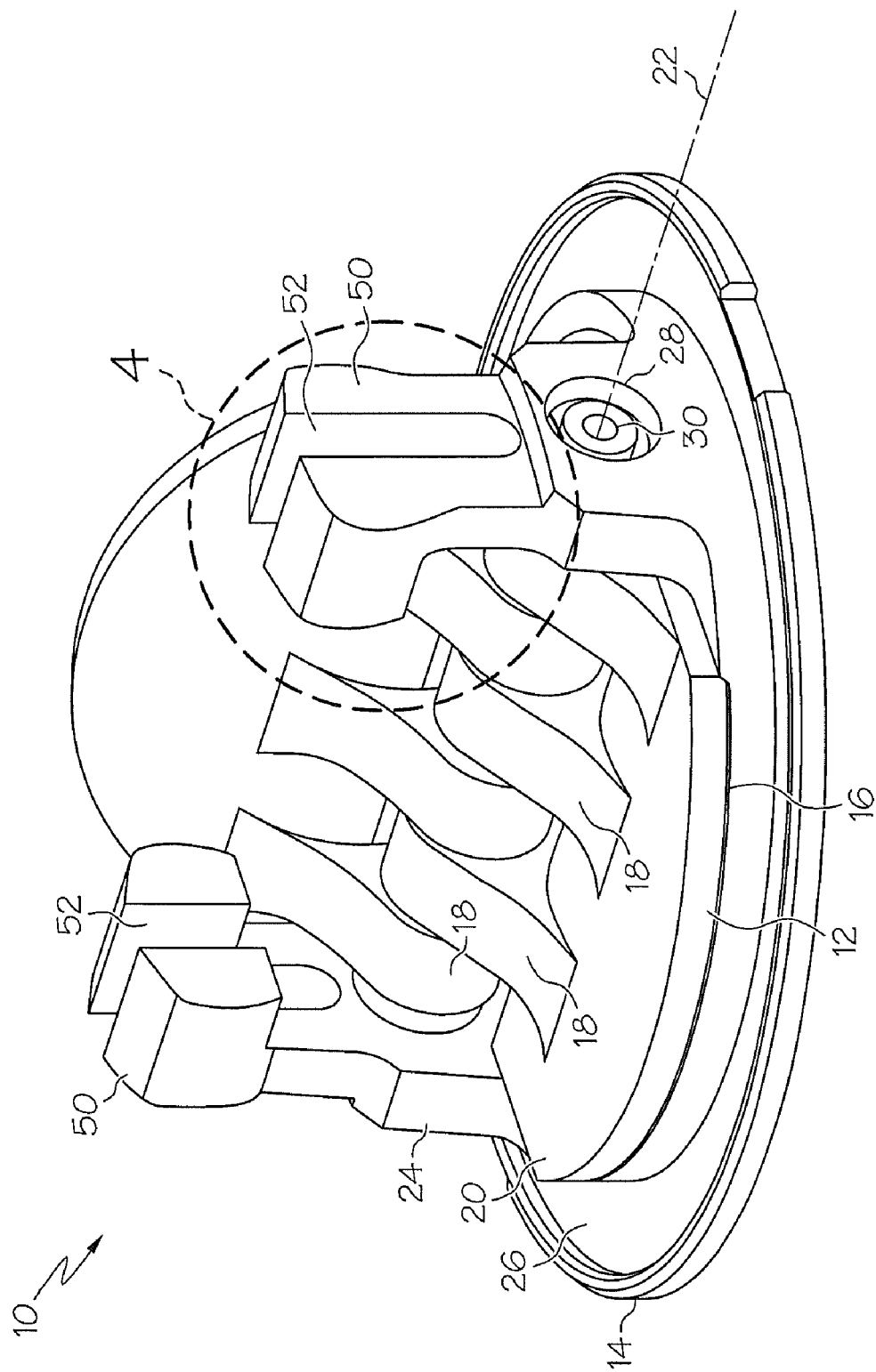
FIG. 3 is a perspective view of another embodiment of a check valve having a compliant petal stop.
Figure 4:
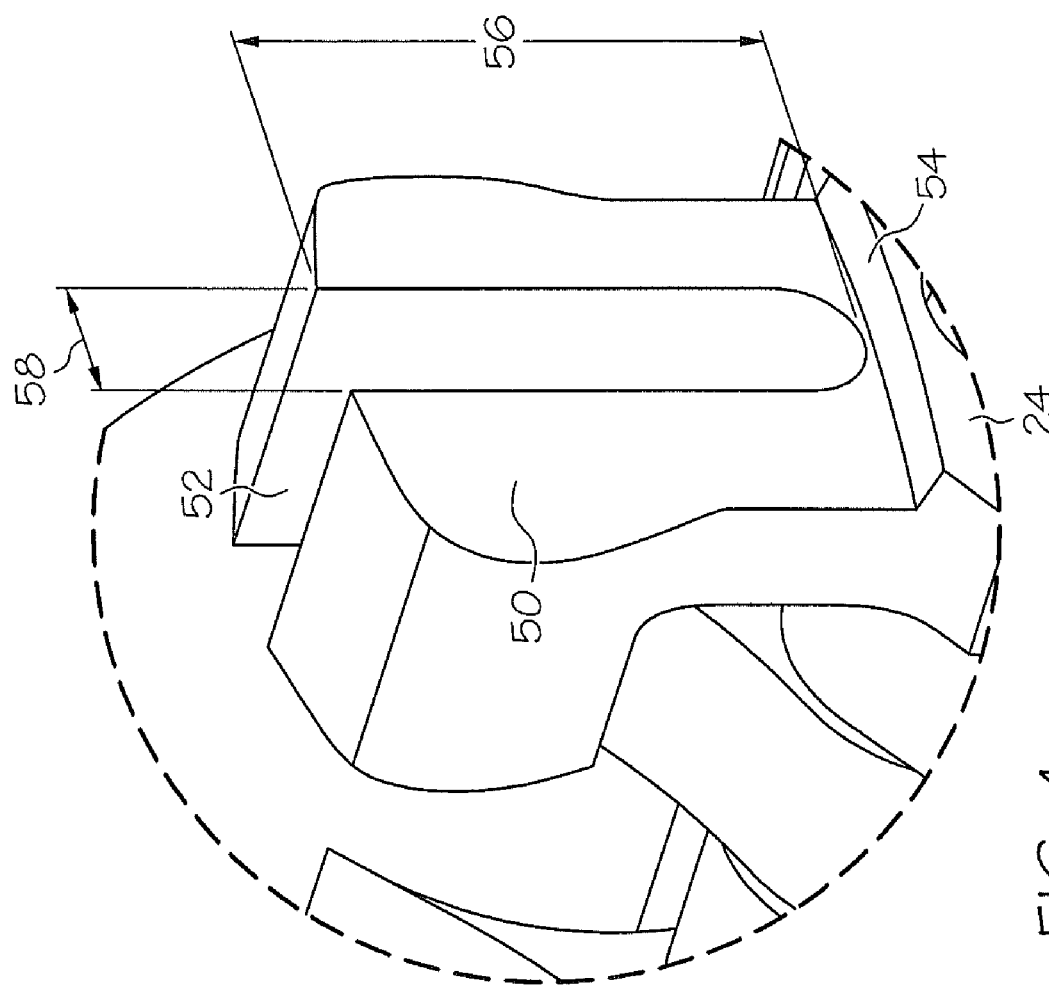
FIG. 4 is an enlarged view of circled area "4" in FIG. 3.

Referring now to FIG. 3, some embodiments of the check valve 10 utilize the two posts 24 to limit the opening angle of the petals 12. To reduce the potential of fracture of the petals 12, a post end 50 is configured to be complaint thereby absorbing impact loads from the petals 12. For example, as shown in FIG. 4, each post 24 may include a post slot 52 extending from the post end 50 toward a post base 54. The amount of compliance in the post 24 is determined by a depth 56 and width 58 of the post slot 52. Further, a width of the post end 50 at a bottom of the post slot 52 is important to determining compliance of the post 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A check valve comprising:
   a valve housing having at least one valve opening;
   at least one petal disposed in the valve housing, the at least one petal configured to substantially cover the at least one valve opening when the at least one petal is in a closed position and rotable about a hinge axis toward an open position thereby allowing fluid to flow through the at least one valve opening; and
   at least one compliant petal stop to prevent rotation of the at least one petal beyond the open position, the compliant petal stop including:
      a stop pin extending from a first post to a second post of the valve housing; and
      at least one compliant stop pin collar disposed at the stop pin and substantially enclosing the stop pin, the stop pin collar configured to absorb impact loads from impact between the at least one petal and the stop pin collar, the at least one stop pin collar including at least one conical section having a constant thickness inner wall tapering toward the stop pin.

2. The check valve of claim 1 wherein the at least one stop pin collar comprises a cylindrical section having an inner wall disposed at a radial distance from the stop pin.

3. The check valve of claim 2 wherein the cylindrical section is substantially coaxial with the stop pin.

4. The check valve of claim 1 wherein the conical section is disposed at least one end of a cylindrical section.

5. The check valve of claim 1 wherein a tip of the conical section contacts the stop pin.

6. The check valve of claim 1 wherein the at least one conical section comprises two conical sections.

7. The check valve of claim 1 wherein the compliant petal stop comprises at least one compliant post extending from the valve housing.

8. The check valve of claim 7 wherein the at least one compliant post comprises two compliant posts.

9. The check valve of claim 1 wherein the petal stop is flexible and absorbent of impact loads.

10. The check valve of claim 1 wherein the at least one petal comprises two petals.

\* \* \* \* \*